(12) United States Patent
Jeong et al.

(10) Patent No.: US 12,275,386 B2
(45) Date of Patent: Apr. 15, 2025

(54) BRAKE APPARATUS FOR VEHICLE

(71) Applicant: HYUNDAI MOBIS Co., Ltd., Seoul (KR)

(72) Inventors: Seung Hwan Jeong, Seoul (KR); Sung Ki Ahn, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 506 days.

(21) Appl. No.: 17/560,867

(22) Filed: Dec. 23, 2021

(65) Prior Publication Data

US 2023/0131725 A1 Apr. 27, 2023

(30) Foreign Application Priority Data

Oct. 25, 2021 (KR) ........................ 10-2021-0143005

(51) Int. Cl.
*B60T 8/36* (2006.01)
*B60T 8/40* (2006.01)
*B60T 11/20* (2006.01)
*B60T 13/68* (2006.01)

(52) U.S. Cl.
CPC ............ *B60T 8/368* (2013.01); *B60T 8/4081* (2013.01); *B60T 11/20* (2013.01); *B60T 13/686* (2013.01)

(58) Field of Classification Search
CPC ........ B60T 8/368; B60T 8/4081; B60T 8/343; B60T 8/4809; B60T 11/20; B60T 13/116; B60T 13/686; B60T 13/141; B60T 15/028; B60T 17/04; B60T 2270/10; B60T 2270/203; B60T 2270/402
USPC ...................................................... 303/119.2
See application file for complete search history.

(56) References Cited

U.S. PATENT DOCUMENTS 5,348,381 A * 9/1994 Bernhardt ............. B60T 8/4872
303/116.1
5,567,023 A 10/1996 Yoo
5,791,747 A * 8/1998 Sorensen ............. B60T 8/3635
303/119.2

(Continued)

FOREIGN PATENT DOCUMENTS

DE 44 31 651 A1 3/1996
DE 10 2012 209 218 A1 12/2013

(Continued)

OTHER PUBLICATIONS

German Office Action dated Sep. 16, 2022, issued in corresponding German Patent Application No. 102021134487.5.

(Continued)

*Primary Examiner* — Robert A. Siconolfi
*Assistant Examiner* — San M Aung
(74) *Attorney, Agent, or Firm* — Morgan, Lewis & Bockius LLP (57) ABSTRACT

A brake apparatus for a vehicle, comprising: a 3-way solenoid valve unit including one or more 3-way solenoid valves, a valve block having a first surface on which the 3-way solenoid valve unit is installed, at least one accumulator, a pressurizing unit, and a plurality of wheel cylinders, wherein each 3-way solenoid valve includes a first port, a second port, a third port, a first opening/closing flow path, and a second opening/closing flow path, and at least a part of the at least one accumulator is disposed between the 3-way solenoid valve unit and a second surface of the valve block.

11 Claims, 6 Drawing Sheets

(56) References Cited

U.S. PATENT DOCUMENTS

| | | | | |
|---|---|---|---|---|
| 6,431,208 B1* | 8/2002 | Fulks | ................... | B60T 8/3675 |
| | | | | 303/119.2 |
| 2013/0319562 A1 | 12/2013 | Weh | | |
| 2015/0321650 A1* | 11/2015 | Schlitzkus | .............. | B60T 8/368 |
| | | | | 137/78.1 |
| 2015/0375723 A1* | 12/2015 | Hurst | ................... | F04B 53/001 |
| | | | | 137/565.11 |
| 2017/0137007 A1* | 5/2017 | Kasper | ................. | B60T 13/662 |
| 2019/0135252 A1* | 5/2019 | Starr | ....................... | B60T 8/441 |
| 2020/0070798 A1* | 3/2020 | Zander | ................... | B60T 8/368 |

FOREIGN PATENT DOCUMENTS

| | | |
|---|---|---|
| JP | 11-511708 A | 10/1999 |
| KR | 10-2015-0091062 A | 8/2015 |

OTHER PUBLICATIONS

Korean Office Action dated Apr. 28, 2023, issued in corresponding Korean Patent Application No. 10-2021-0143005.

* cited by examiner

BRAKE APPARATUS FOR VEHICLE

CROSS-REFERENCE TO RELATED APPLICATION

This application claims priority to and the benefit of Korean Patent Application No. 10-2021-0143005, filed on Oct. 25, 2021, the disclosure of which is incorporated herein by reference in its entirety.

BACKGROUND

1. Technical Field

The present disclosure relates to a brake apparatus for a vehicle.

2. Discussion of Related Art

The contents described herein provide only background information and do not constitute the related art.

A normal open type solenoid valve is a solenoid valve which opens a flow path when a current is not applied thereto. A normal close type solenoid valve is a solenoid valve which closes a flow path when a current is not applied thereto. A hydraulic brake apparatus of a vehicle transfers a working fluid to a plurality of wheel brake units by adjusting an open and close state of each of a plurality of solenoid valves.

Figure 6:
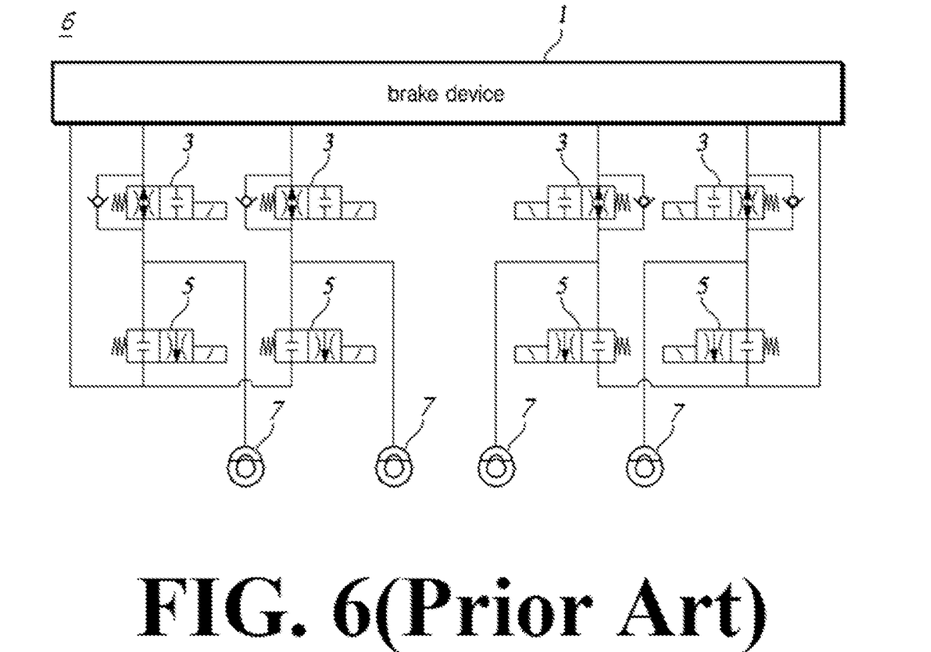
FIG. 6 is a simple block diagram illustrating a conventional brake device for a vehicle.

FIG. 6 is a simple block diagram illustrating a conventional brake apparatus for a vehicle.

Referring to FIG. 6, in a hydraulic brake apparatus of a vehicle, normal open type inlet valves 3 and normal close type outlet valves 5 are installed. A working fluid is supplied to the inlet valves 3 and the outlet valves 5 from a brake device 1. When the inlet valve 3 is opened, the working fluid of the brake device 1 flows to a wheel cylinder so that a hydraulic pressure in the wheel cylinder increases. When the outlet valve 5 is opened, the working fluid of the wheel cylinder is discharged to the brake device 1 so that the hydraulic pressure in the wheel cylinder decreases. Since the hydraulic brake device having such a structure includes the plurality of solenoid valves, there is a problem of high manufacturing costs. There is a problem in that a volume of a valve block for accommodating the plurality of solenoid valves is also inevitably increased.

SUMMARY

The present disclosure is directed to providing a brake apparatus for a vehicle in which a 3-way solenoid valve serves as an inlet valve and an outlet valve to reduce manufacturing costs and a volume of a hydraulic brake apparatus.

Objectives to be solved by the present disclosure are not limited by the above-described objectives, and the other objectives, which are not described above, will be clearly understood by those skilled in the art through the following descriptions.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

In the present specification, the terms "left-hand side"/"right-hand side" or "upper part"/"lower part" are only for indicating directions in which components are illustrated in the drawings, and the contents of the present disclosure are not interpreted as being limited to the arrangement directions and positions thereof.

Figure 1:
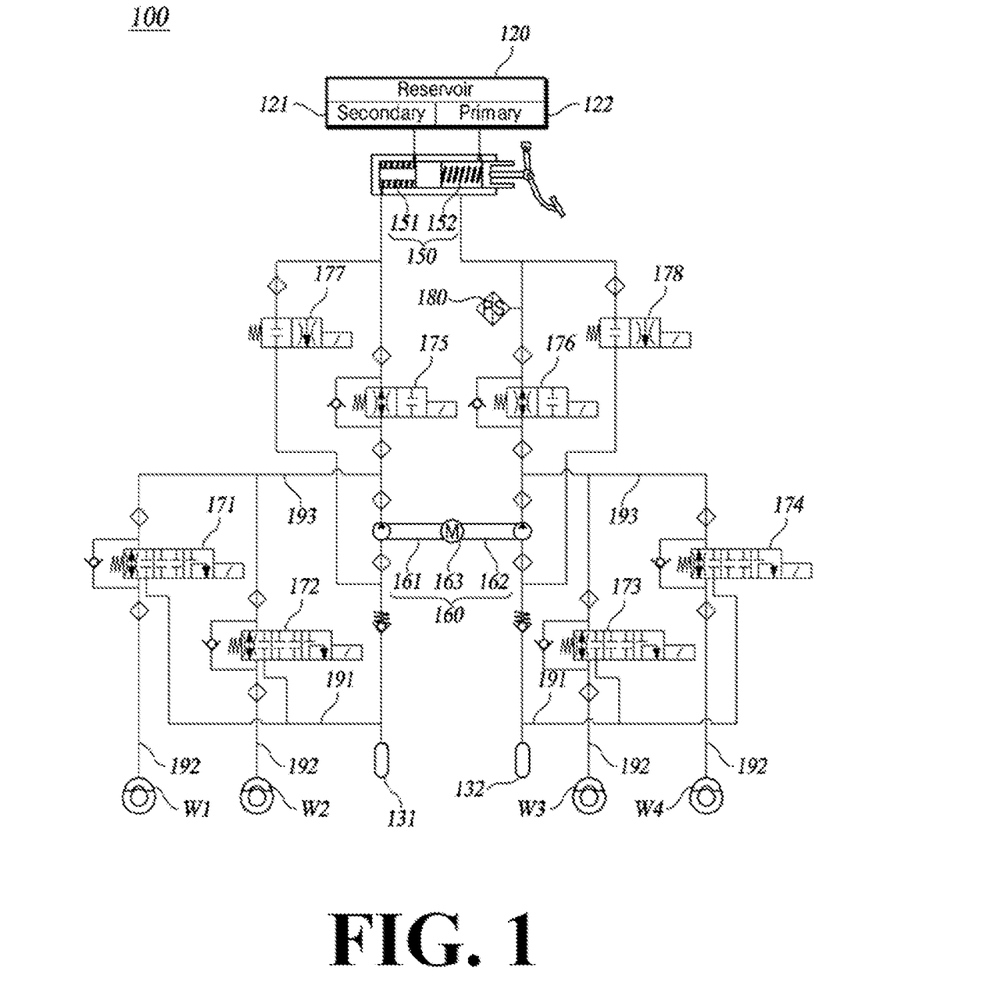
FIG. 1 is a hydraulic circuit diagram illustrating a brake apparatus for a vehicle according to one embodiment of the present disclosure.

FIG. 1 is a hydraulic circuit diagram illustrating a brake apparatus for a vehicle according to one embodiment of the present disclosure.

Figure 2:
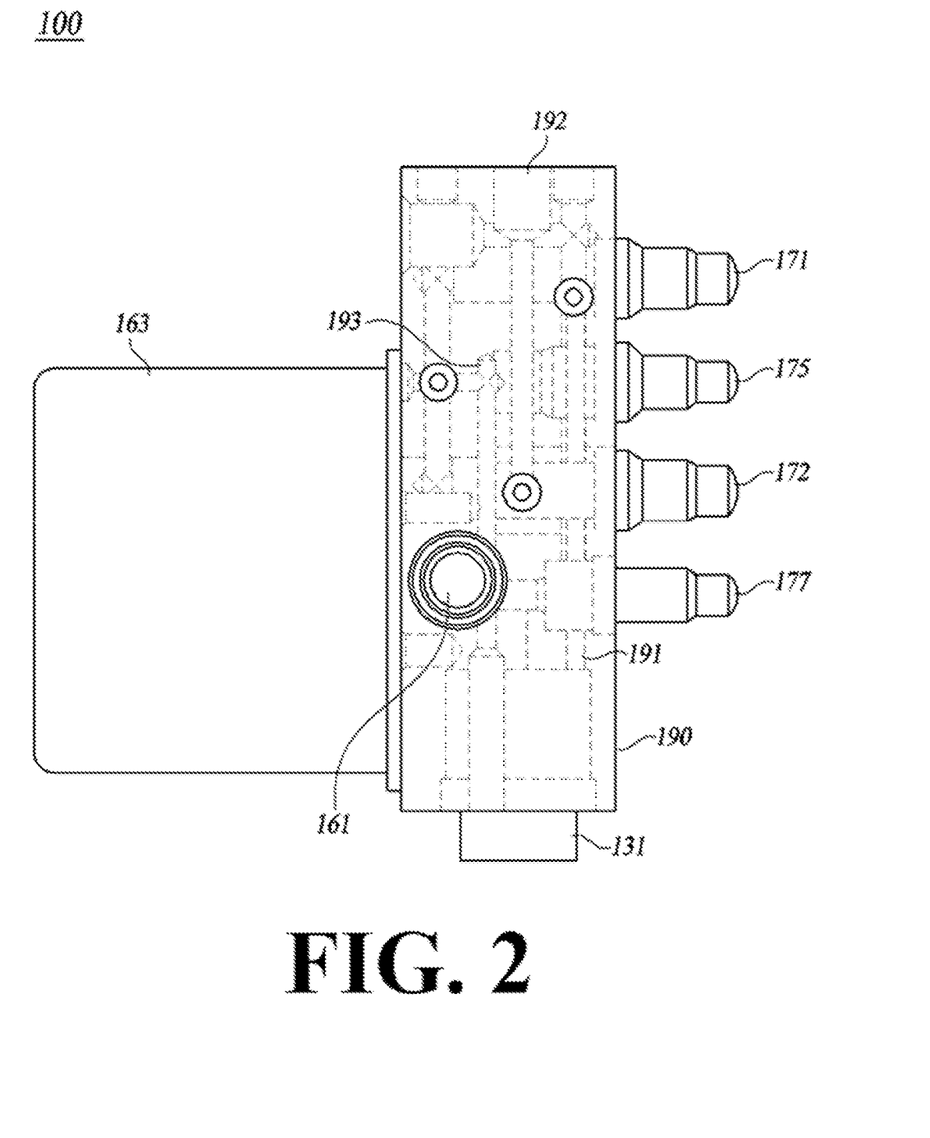
FIG. 2 is a side view illustrating the brake apparatus for a vehicle according to one embodiment of the present disclosure.

FIG. 2 is a side view illustrating the brake apparatus for a vehicle according to one embodiment of the present disclosure.

Figure 3:
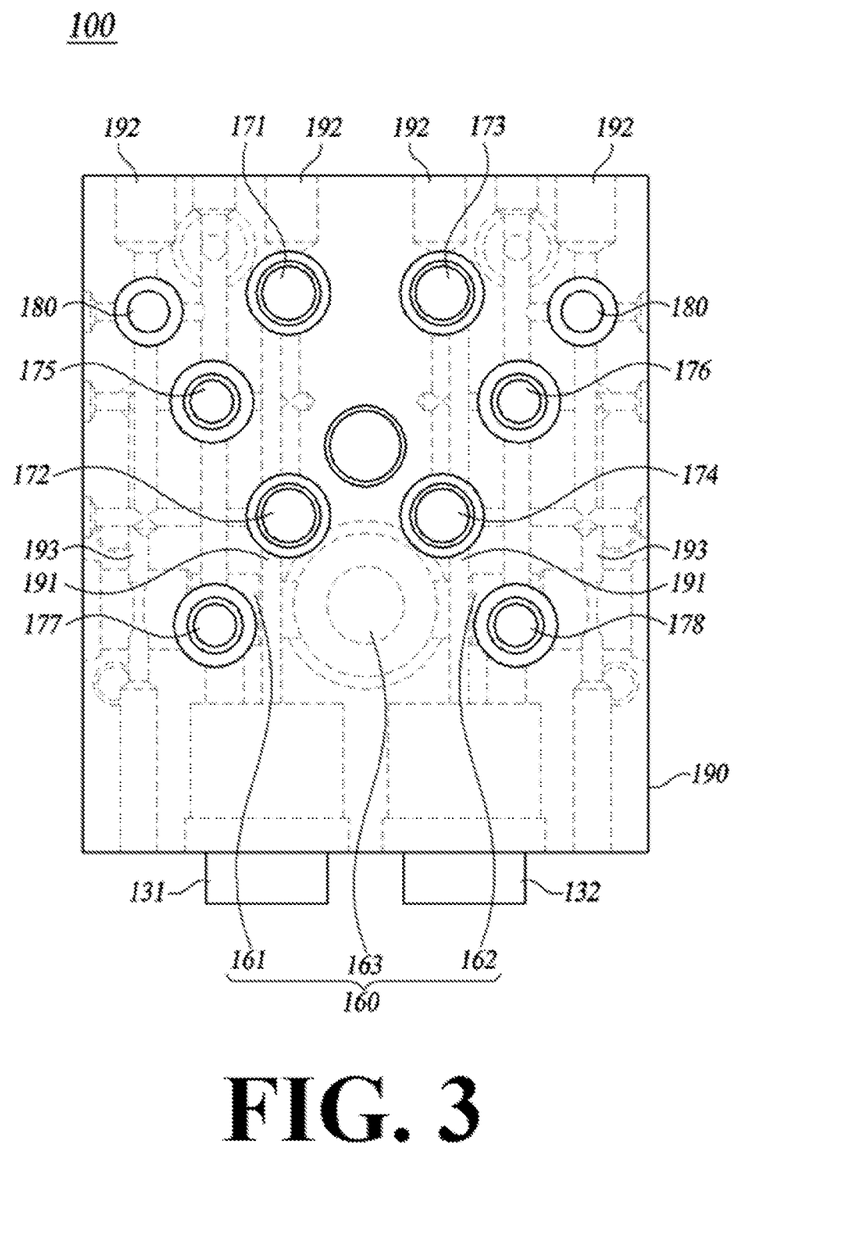
FIG. 3 is a front view illustrating the brake apparatus for a vehicle according to one embodiment of the present disclosure.

FIG. 3 is a front view illustrating the brake apparatus for a vehicle according to one embodiment of the present disclosure.

Figure 4:
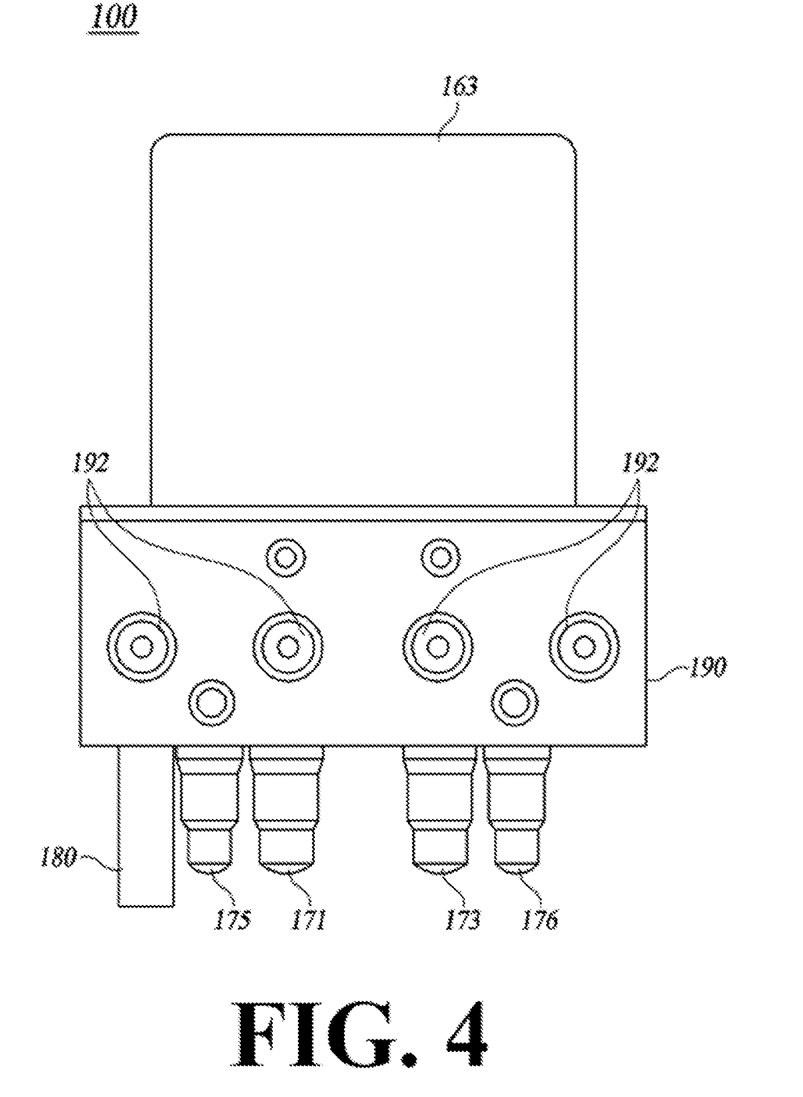
FIG. 4 is a top view illustrating some components of the brake apparatus for a vehicle according to one embodiment of the present disclosure.

FIG. 4 is a top view illustrating some components of the brake apparatus for a vehicle according to one embodiment of the present disclosure.

Referring to FIGS. 1 to 4, a brake apparatus 100 for a vehicle according to one embodiment of the present disclosure includes all or some of 3-way solenoid valve units 171 to 174, a valve block 190, accumulators 130, an oil reservoir 120, pressurizing units 150 and 160, a plurality of wheel cylinders w1, w2, w3, and w4, and a pressure sensor 180.

The pressurizing units 150 and 160 are configured to pressurize a working fluid. The pressurizing units 150 and 160 may include at least one of a master cylinder 150 and a motor pump 160. The master cylinder 150 is configured to generate a hydraulic pressure corresponding to a brake signal. In this case, the brake signal may be a signal corresponding to an amount of a pedal stroke of a driver or a deceleration signal provided by an autonomous driving system. The master cylinder 150 may be disposed so that a longitudinal direction of the master cylinder 150 is parallel to one surface of the valve block 190. The master cylinder 150 may include a first hydraulic chamber 151 and a second hydraulic chamber 152. The motor pump 160 may include a first pump 161 and a second pump 162 which are driven by an eccentric rotation shaft (not shown) of a motor 163 installed on one surface of the valve block 190. The motor 163 may be installed on a third surface of the valve block 190. In the present disclosure, the third surface refers to a surface opposite to a surface on which the 3-way solenoid valve units 171 to 174 are installed. The first pump 161 and the second pump 162 may be disposed in the valve block 190.

The accumulators 130 are configured to store the working fluid. The accumulators 130 may be connected to the wheel cylinders w1, w2, w3, and w4. When fluid in the wheel cylinders w1, w2, w3, and w4 flows to the accumulators 130, a hydraulic pressure in each of the wheel cylinders w1, w2, w3, and w4 is reduced.

The accumulator 130 may be connected to an inlet of the motor pump 160. The fluid flowing from the accumulator 130 to the motor pump 160 is pressurized in the motor pump 160. In the present disclosure, the accumulator 130 connected to the first pump 161 is referred to as a first accumulator 131, and the accumulator 130 connected to the second pump 162 is referred to as a second accumulator 132. The accumulator 130 may have a cylindrical shape of which a bottom surface is parallel to a second surface.

The oil reservoir 120 stores the working fluid. The master cylinder 150 may be disposed between and connected to the oil reservoir 120 and the wheel cylinders w1, w2, w3, and w4 in series. The fluid of the oil reservoir 120 may flow to the wheel cylinders w1, w2, w3, and w4 through the pressurizing units 150 and 160. The oil reservoir 120 may be connected to inlets of the first and second pumps 161 and 162. The fluid flowing from the oil reservoir 120 to the motor pump 160 is pressurized in the motor pump 160. The oil reservoir 120 may be disposed so that a longitudinal direction thereof is parallel to one surface of the valve block 190. The oil reservoir 120 may include a first reservoir chamber 121 and a second reservoir chamber 122, and each of the reservoir chambers 121 and 122 may be connected to one of the different hydraulic chambers 151 and 152. In the present disclosure, the accumulator 130 and/or the oil reservoir 120 are referred to as fluid storage units 120 and 130.

Referring to FIG. 1, the brake apparatus 100 for a vehicle includes the plurality of wheel cylinders w1, w2, w3, and w4. The wheel cylinders w1, w2, w3, and w4 are configured to restrict rotation of wheels using a hydraulic pressure of the working fluid. Each of the wheel cylinders w1, w2, w3, and w4 may be installed on one of wheels of the vehicle. The brake apparatus 100 for a vehicle according to one embodiment of the present disclosure may include front wheel cylinder units w1 and w2 and rear wheel cylinder units w3 and w4. The front wheel cylinder units w1 and w2 include a left front wheel cylinder w1 installed on a left front wheel and a right front wheel cylinder w2 installed on a right front wheel. The rear wheel cylinder units w3 and w4 include a left rear wheel cylinder w3 installed on a left rear wheel and a right rear wheel cylinder w4 installed on a right rear wheel. The wheel cylinders w1, w2, w3, and w4 are connected to the accumulators 130 and the pressurizing units 150 and 160. The wheel cylinders w1, w2, w3, and w4 may be connected to the pressurizing units 150 and 160 in parallel.

A valve unit 170 includes a plurality of solenoid valves. Specifically, the valve unit 170 includes all or some of the 3-way solenoid valve units 171 to 174, a first traction control valve 175, a second traction control valve 176, a first high pressure switch valve 177, and a second high pressure switch valve 178. The valve unit 170 is configured to change a flow path in the valve block 190, that is, a path through which the fluid flows between the fluid storage units 120 and 130, the pressurizing units 150 and 160, and the plurality of wheel cylinders w1, w2, w3, and w4, and/or to change an amount of the fluid flowing along the flow path in response to a valve control signal. For example, each of the solenoid valves may be configured to change an opening/closing state thereof according to an amount of a current applied thereto.

Figure 5:
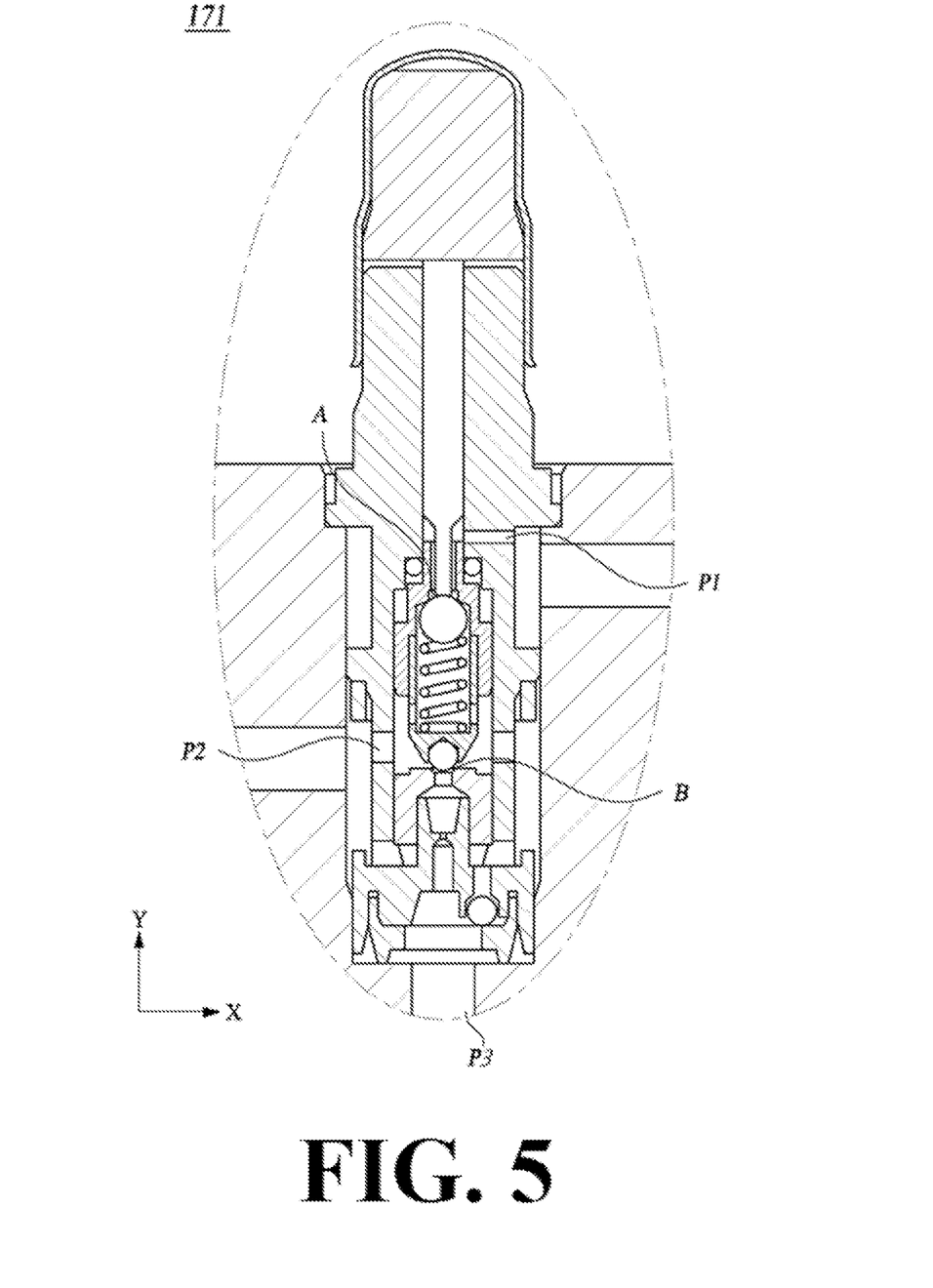
FIG. 5 is a cross-sectional view illustrating a 3-way solenoid valve according to one embodiment of the present disclosure.

FIG. 5 is a cross-sectional view illustrating the 3-way solenoid valve according to one embodiment of the present disclosure.

FIG. 6 is a simple block diagram illustrating a conventional brake device for a vehicle.

Referring to FIG. 6, in a general brake apparatus 6 for a vehicle, inlet valves 3 and outlet valves 5 are connected to wheel cylinders. The inlet valves 3 are opened or closed to regulate the fluid to flow from a brake device 1 to wheel cylinders 7, and the outlet valves 5 are opened or closed to regulate the fluid to flow from the wheel cylinders 7 to the brake device 1. Referring to FIG. 5, the 3-way solenoid valve units 171 to 174 include at least one of 3-way solenoid valves 171 to 174. The 3-way solenoid valve units 171 to 174 are installed on a first surface of the valve block 190.

The 3-way solenoid valves 171 to 174 are opened or closed to regulate the fluid to flow between the pressurizing units 150 and 160 and the wheel cylinders w1, w2, w3, and w4 and the fluid to flow between the fluid storage units 120 and 130 and the wheel cylinders w1, w2, w3, and w4. That is, the 3-way solenoid valves 171 to 174 have all functions of the inlet valves 3 and the outlet valves 5. Instead of the inlet valve 3 and the outlet valve 5, the 3-way solenoid valves 171 to 174 are connected to the wheel cylinders w1, w2, w3, and w4 according to one embodiment of the present disclosure. Accordingly, the number of solenoid valves connected to the brake apparatus 100 for a vehicle may be reduced. In the present disclosure, one valve of the 3-way solenoid valves 171 to 174 connected to a side of the left front wheel cylinder is referred to as a left front wheel 3-way solenoid valve 171. Another valve of the 3-way solenoid valves 171 to 174 connected to a side of the right front wheel cylinder is referred to as a right front wheel 3-way solenoid valve 172. Still another valve of the 3-way solenoid valves 171 to 174 connected to a side of the left rear wheel cylinder is referred to as a left rear wheel 3-way solenoid valve 173. Yet another valve of the 3-way solenoid valves 171 to 174 connected to a side of the right rear wheel cylinder is referred to as a right rear wheel 3-way solenoid valve 174.

First to third ports P1, P2, and P3 are formed in each of the 3-way solenoid valves 171 to 174. The first ports P1 may be connected to a side of the accumulator 130. The second port P2 may be connected to a side of each of the wheel cylinders w1, w2, w3, and w4. The third port P3 may be connected to a side of each of the pressurizing units 150 and 160. Each of the 3-way solenoid valves 171 to 174 includes a first opening/closing flow path A configured to allow the first port P1 and the second port P2 to fluidly communicate with each other or to block the first port P1 and the second port P2 from each other and a second opening/closing flow path B configured to allow the second port P2 and the third port P3 to fluidly communicate with each other or to block the second port P2 and the third port P3 from each other. An opening/closing state of each of the first and second opening/closing flow paths A and B may be adjusted by an amount of a current applied to each of the 3-way solenoid valves 171 to 174.

When the first opening/closing flow path A is closed and the second opening/closing flow path B is opened, the fluid pressurized in the pressurizing units 150 and 160 sequentially passes through the third port P3 and the second port P2 and flows to each of the wheel cylinders w1, w2, w3, and w4. Accordingly, a braking pressure of each of the wheel cylinders w1, w2, w3, and w4 increases. Such a flow path connection state corresponds to a flow path connection state, in which the inlet valves 3 are opened and the outlet valves 5 are closed, of the brake apparatus 6 for a vehicle. When both of the first opening/closing flow path A and the second opening/closing flow path B are closed, a hydraulic pressure generated in each of the pressurizing units 150 and 160 is not transferred to the wheel cylinders w1, w2, w3, and w4, and the fluid in the wheel cylinders w1, w2, w3, and w4 does not flow to the accumulators 130. Accordingly, a braking pressure of each of the wheel cylinders w1, w2, w3, and w4 is maintained. Such a flow path connection state corresponds to a flow path connection state, in which both of the inlet valves 3 and the outlet valves 5 are closed, of the brake apparatus 6 for a vehicle. When the first opening/closing flow path A is opened and the second opening/closing flow path B is closed, the fluid in the wheel cylinders w1, w2, w3, and w4 flows to the accumulators 130, and the hydraulic pressures generated in the pressurizing units 150 and 160 are not transferred to the wheel cylinders w1, w2, w3, and w4. Accordingly, the hydraulic pressure in each of the wheel cylinders w1, w2, w3, and w4 is reduced. Such a flow path connection state corresponds to a flow path connection state, in which the inlet valves 3 are closed and the outlet valves 5 are opened, of the brake apparatus 6 for a vehicle. The first to third ports P1, P2, and P3 may be disposed to be spaced apart from each other in a longitudinal direction of each of the 3-way solenoid valves 171 to 174. At least one of the 3-way solenoid valves 171 to 174 may be disposed in a region extending from the bottom surface of the accumulator 130 in a direction perpendicular to the second surface.

The traction control valves 175 and 176 may be installed on flow paths connecting the master cylinder 150 and the wheel cylinders w1, w2, w3, and w4. The traction control valves 175 and 176 are opened or closed to regulate the fluid to flow from the master cylinder 150 toward the wheel cylinders w1, w2, w3, and w4. Each of the traction control valves 175 and 176 may be a normal open type valve which opens a flow path when a current is not applied to a coil (not shown). The high pressure switch valve 177 and 178 may be installed on flow paths connecting the fluid storage units and the inlets of the motor pump 160. The high pressure switch valves 177 and 178 according to one embodiment of the present disclosure are installed on flow paths connecting the inlets of the motor pump 160 and the accumulators 130. The high pressure switch valve 177 and 178 are opened or closed to regulate the fluid to flow from the fluid storage units 120 and 130 to an entrance of the motor pump. Each of the high pressure switch valves 177 and 178 may be a normal closed type valve which closes a flow path when a current is not applied to a coil. The valve unit of the present disclosure is not limited to the valve unit including only the above-described valves. For example, the valve unit of the present disclosure may further include a mixing valve (not shown) which mixes the fluid supplied to the front wheel cylinders w1 and w2 and the fluid supplied to the rear wheel cylinders w3 and w4.

The brake apparatus 100 for a vehicle may include at least one pressure sensor 180. The pressure sensor 180 is configured to detect the hydraulic pressure of at least one of the wheel cylinders w1, w2, w3, and w4 and a hydraulic pressure of the master cylinder 150.

Referring to FIG. 1, four wheel cylinders w1, w2, w3, and w4 are installed on different wheels, and each of four 3-way solenoid valves 171 to 174 is connected to the side of one of the different wheel cylinders w1, w2, w3, and w4. However, the brake apparatus 100 for a vehicle of the present disclosure is not limited to such a structure. For example, in the brake apparatus 100 for a vehicle of the present disclosure, the 3-way solenoid valves 171 and 172 are respectively connected to the front wheel cylinder units w1 and w2, and inlet valves 3 and outlet valves 5 may be respectively connected to the rear wheel cylinder units w3 and w4. The first hydraulic chamber 151, the first pump 161, and the first accumulator 131 are connected to the left front wheel and right front wheel 3-way solenoid valves 171 and 172. The second hydraulic chamber 152, the second pump 162, and the second accumulator 132 are connected to the left rear wheel and right rear wheel 3-way solenoid valves 173 and 174. The first port P1, the second port P2, and the third port P3 of each of the 3-way solenoid valves 171 to 174 are connected to the side of each of the accumulators 130, each of the wheel cylinders w1, w2, w3, and w4, and each of the pressurizing units 150 and 160. In the present disclosure, flow paths connecting the 3-way solenoid valves 171 to 174 and the accumulators 130 are referred to as first flow paths 191.

The first traction control valve 175 is disposed between and connected to the first hydraulic chamber 151 of the master cylinder 150 and the front wheel cylinders w1 and w2 in series. The second traction control valve 176 is disposed between and connected to the second hydraulic chamber 152 and the rear wheel cylinders w3 and w4 in series. The fluid pressurized in the master cylinder 150 may sequentially pass through the traction control valves 175 and 176 and the 3-way solenoid valves 171 to 174 to flow to the wheel cylinders w1, w2, w3, and w4. The first reservoir chamber 121 and the first hydraulic chamber 151 may be connected, and the second reservoir chamber 122 and the second hydraulic chamber 152 may be connected. The first high pressure switch valve 177 may be installed on a flow path connecting the first hydraulic chamber 151 and the entrance of the first pump 161, and the second high pressure switch valve 178 may be installed on a flow path connecting the second hydraulic chamber 152 and the entrance of the second pump 162. The fluid in the first reservoir chamber 121 may sequentially pass through the first hydraulic chamber 151 and the first high pressure switch valve 177 to be supplied to the first pump 161. The fluid in the second reservoir chamber 122 may sequentially pass through the second hydraulic chamber 152 and the second high pressure switch valve 178 to be supplied to the second pump 162. In addition, the first accumulator 131 may be connected to the first pump 161, and the second accumulator 132 may be connected to the second pump 162. In the present disclosure, the left front wheel and right front wheel cylinders w1 and w2 are connected to the first pump 161 and the first accumulator 131, and the left rear wheel and right rear wheel cylinder w3 and w4 are connected to the second pump 162 and the second accumulator 132, but the present disclosure is not limited to such connection relationships. For example, in the brake apparatus 100 for a vehicle, the left front wheel and right rear wheel cylinders w1 and w4 may be connected to the first pump 161 and the first accumulator 131, and the right front wheel and left rear wheel cylinders w2 and w3 may be connected to the second pump 162 and the second accumulator 132.

When the second opening/closing flow path B is opened and the first opening/closing flow path A is closed, since the fluid pressurized in the oil reservoir 120 and/or the motor pump 160 sequentially passes through the third port P3 and the second port P2 of each of the 3-way solenoid valves 171 to 174 to flow to each of the wheel cylinders w1, w2, w3, and w4, the hydraulic pressure of each of the wheel cylinders w1, w2, w3, and w4 increases. When the second opening/closing flow path B is closed and the first opening/closing flow path A is opened, the fluid in each of the wheel cylinders w1, w2, w3, and w4 may sequentially pass through the second port P2 and the first port P1 to flow to the accumulator 130. Accordingly, the hydraulic pressure of each of the wheel cylinders w1, w2, w3, and w4 decreases. When the first and second opening/closing flow paths A and B are closed, the hydraulic pressure of each of the wheel cylinders w1, w2, w3, and w4 is maintained.

The pressure sensor 180 is configured to detect the hydraulic pressure of at least one of the wheel cylinders w1, w2, w3, and w4 and the hydraulic pressure of the master cylinder 150. The pressure sensor 180 is disposed between the 3-way solenoid valves 171 to 174 and a fourth surface of the valve block 190. In this case, the fourth surface is a surface perpendicular to the first surface and the second surface. For example, the fourth surface in FIG. 3 may be a left surface or right surface of the valve block 190.

The valve unit 170 is installed in a valve bore punched in the first surface of the valve block 190. The valve unit 170 may be installed perpendicular to the first surface. The motor 163 may be installed on the third surface of the valve block 190. In the present disclosure, the third surface is referred to as a surface opposite to the first surface. The first and second pumps 161 and 162 driven by rotation of the motor 163 may be disposed in the valve block 190. In the present disclosure, the flow paths through which the accumulators 130 and the 3-way solenoid valves 171 to 174 communicate with each other are referred to as the first flow paths 191. At least parts of the accumulators 131 and 132 are disposed between the second surface of the valve block 190 and the 3-way solenoid valves 171 to 174. Accordingly, even when the first flow paths 191 are only formed to extend in one direction from the accumulators 131 and 132, the 3-way solenoid valves 171 to 174 and the accumulator 131 and 132 may be communicated with each other. Parts of the accumulators 130 may be accommodated in the valve block 190, and the remaining parts thereof may be disposed to be exposed to the outside of the valve block 190. All of the accumulators 130 may be accommodated in the valve block 190. Alternatively, the accumulators 130 and the valve block 190 are not manufactured individually, and the accumulators 130 may be formed as a hollow in the valve block 190. The accumulator 130 may have a cylindrical shape of which the bottom surface is parallel to the second surface, and at least one of the 3-way solenoid valves 171 to 174 may be disposed in a region extending from the bottom surface of the accumulator 130 in the direction perpendicular to the second surface. Due to such a layout, the third port P3 is positioned in a region extending from an outer circumferential surface of each of the accumulators 131 and 132 in a direction of a central axis. Second flow paths 192 may be formed to pass through the third surface of the valve block 190. In this case, the third surface is the surface opposite to the first surface. The master cylinder 150 connected to third flow paths 193 may be disposed at a position adjacent to the third surface.

The pair of cylindrical accumulators 131 and 132 are disposed on a bottom surface of the valve block 190. Each of the pair of first flow paths 191 extends from one of the different accumulators 131 and 132 in a height direction of the valve block 190. The pair of 3-way solenoid valves 171 and 172 is connected to the first flow path 191, which communicates with the first accumulator 131, in parallel. The pair of 3-way solenoid valves 173 and 174 is connected to the first flow path 191, which communicates with the second accumulator 132, in parallel. Specifically, the first port P1 of each of the 3-way solenoid valves 171 to 174 is connected to the accumulator 130. At least parts of the 3-way solenoid valves 171 to 174 are disposed in regions extending from the bottom surfaces of the accumulators 130 in a height direction of thereof. Hereinafter, the 3-way solenoid valves 171 and 172 connected to a left side first flow path 191 are referred to as front wheel 3-way solenoid valves 171 and 172. The 3-way solenoid valves 173 and 174 connected to a right side first flow path 191 are referred to as rear wheel 3-way solenoid valves 173 and 174.

One of the front wheel 3-way solenoid valves 171 and 172 is connected to the left front wheel cylinder w1, and the other thereof is connected to the right front wheel cylinder w2. One of the pair of rear wheel 3-way solenoid valves 173 and 174 is connected to the left rear wheel cylinder w3, and the other thereof is connected to the right rear wheel cylinder w4. Specifically, the second port P2 of each of the 3-way solenoid valves 171 to 174 is connected to the side of one of the wheel cylinders w1, w2, w3, and w4.

The third port P3 of each of the front wheel 3-way solenoid valves 171 and 172 is connected to an exit of the first pump 161 and the first hydraulic chamber 151. The third port P3 of each of the rear wheel 3-way solenoid valves 173 and 174 is connected to an exit of the second pump 162 and the second hydraulic chamber 152. The first traction control valve 175 is installed on the third flow path 193 connecting the first hydraulic chamber 151 of the master cylinder 150 and the front wheel 3-way solenoid valves 171 and 172. The second traction control valve 176 is installed on the second flow path 192 connecting the second hydraulic chamber 152 of the master cylinder 150 and the rear wheel 3-way solenoid valves 173 and 174. The exit of the first pump 161 is connected to the flow path connecting the first traction control valve 175 and the front wheel 3-way solenoid valves 171 and 172. The exit of the second pump 162 is connected to the flow path connecting the second traction control valve 176 and the rear wheel 3-way solenoid valves 173 and 174. Due to such connection relationships, the first traction control valve 175 is disposed between the front wheel 3-way solenoid valves 171 and 172 in a direction perpendicular to the second surface. The second traction control valve 176 is disposed between the rear wheel 3-way solenoid valves 173 and 174 in the direction perpendicular to the second surface.

The first to third ports P1, P2, and P3 according to one embodiment of the present disclosure are disposed to be spaced apart from each other in the longitudinal direction of each of the 3-way solenoid valves 171 to 174. In the valve block 190, at least a part of the first flow path 191 connecting the first port P1 and the accumulator 130 is disposed on a surface spaced apart from the first surface by a first distance. The second flow path 192 connecting the second port P2 and each of the corresponding wheel cylinders w1, w2, w3, and w4 is disposed on a surface spaced apart from the first surface by a second distance. The third flow path 193 connecting the third port P3 to the pressurizing units 150 and 160 is disposed on a surface spaced apart from the first surface by a third distance.

Referring to FIG. 5, the first port P1 is disposed above the second port P2 in each of the 3-way solenoid valves 171 to 174. The second port P2 is disposed above the third port P3 in each of the 3-way solenoid valves 171 to 174. Due to such a structure, the second port P2 is disposed at a position spaced further apart from an installation surface in a direction toward the motor pump 160 than the first port P1 in each of the 3-way solenoid valves 171 to 174. The third port P3 is disposed at a position spaced further apart from the installation surface in the direction toward the motor pump 160 than the second port P2 in each of the 3-way solenoid valves 171 to 174. Accordingly, the second flow path 192 is disposed to be closer to the motor pump 160 than the first flow path 191, and the third flow path 193 is disposed to be closer to the motor pump 160 than the second flow path 192. The first and second pumps 161 and 162 are disposed in the valve block 190.

The accumulator 130 is installed on the bottom surface of the valve block 190, the first and second pumps 161 and 162 are disposed above the accumulator 130, and the 3-way solenoid valve is disposed above the first and second pumps 161 and 162.

The first high pressure switch valve 177 is installed on the flow path connecting the first hydraulic chamber 151 and the entrance of the first pump 161. The second high pressure switch valve 178 is installed on the flow path connecting the second hydraulic chamber 152 and the entrance of the second pump 162.

In the brake apparatus 100 for a vehicle according to one embodiment of the present disclosure, as many of the first flow paths 191, the second flow paths 192, and the third flow paths 193, which are opened or closed to control the hydraulic pressures of the sides of the front wheel cylinders w1 and w2, are formed as the number of the 3-way solenoid valves 171 to 174. The flow paths may be disposed to be laterally symmetrical in the valve block 190. When the flow paths are disposed as described above, the flow paths disposed at one side of the laterally symmetrical flow paths guide a flow path of the fluid provided to the front wheel cylinders w1 and w2, and the flow paths disposed at the other side thereof guide a flow path of the fluid provided to the rear wheel cylinders w3 and w4.

In the brake apparatus 100 for a vehicle according to one embodiment of the present disclosure, since the 3-way solenoid valves 171 to 174 serve as the inlet valves 3 and the outlet valves 5, there is an effect of reducing manufacturing costs of the hydraulic brake apparatus. In addition, there are effects of reducing a volume of the valve block 190 and simplifying a manufacturing process of the valve block 190.

According to one embodiment, in a brake apparatus for a vehicle, since a 3-way solenoid valve serves as an inlet valve and an outlet valve, manufacturing costs and a volume of a hydraulic brake apparatus can be reduced.

What is claimed is:

1. A brake apparatus for a vehicle, comprising:
a 3-way solenoid valve unit including one or more 3-way solenoid valves;
a valve block having a first surface on which the 3-way solenoid valve unit is installed;
at least one accumulator configured to store a working fluid;
a pressurizing unit configured to pressurize the working fluid; and
a plurality of wheel cylinders configured to restrict rotation of vehicle wheels using a hydraulic pressure of the working fluid,
wherein each 3-way solenoid valve includes a first port, a second port, a third port, a first opening/closing flow path configured to allow the first port and the second port to fluidly communicate with each other or to block the first port and the second port from each other, and a second opening/closing flow path configured to allow the second port and the third port to fluidly communicate with each other or to block the second port and the third port from each other,
at least a part of the at least one accumulator is disposed between the 3-way solenoid valve unit and a second surface of the valve block,
the pressurizing unit includes a master cylinder configured to generate a hydraulic pressure corresponding to a brake signal,
a traction control valve is installed on a flow path connecting the master cylinder and the 3-way solenoid valve unit, and
the traction control valve is disposed further away from a center axis of the valve block than the 3-way solenoid valve unit in a width direction of the valve block, wherein the second surface of the valve block and an opposite surface thereof oppose each other in the height direction and the width direction is perpendicular to the height direction.

2. The brake apparatus of claim 1, wherein:
the at least one accumulator has a cylindrical shape of which a bottom surface is parallel to the second surface; and
at least one of the one or more 3-way solenoid valves is disposed in a region extending from the bottom surface of the at least one accumulator in a direction perpendicular to the second surface.

3. The brake apparatus of claim 1, wherein the 3-way solenoid valve unit is installed to be perpendicular to the first surface of the valve block.

4. The brake apparatus of claim 1, wherein:
the first, second, and third ports of each 3-way solenoid valve are disposed to be spaced apart from each other in a longitudinal direction thereof; and
in the valve block,
at least a part of a first flow path connecting the first port of each 3-way solenoid valve to the at least one accumulator is disposed on a surface spaced apart from the first surface by a first distance,
a second flow path connecting the second port of each 3-way solenoid valve and the corresponding wheel cylinder of the plurality of wheel cylinders is disposed on a surface spaced apart from the first surface by a second distance, and
a third flow path connecting the third port of each 3-way solenoid valve to the pressurizing unit is disposed on a surface spaced apart from the first surface by a third distance.

5. The brake apparatus of claim 4, wherein:
the second flow path passes through a third surface of the valve block, which is a surface opposite to the second surface.

6. The brake apparatus of claim 1, wherein:
the at least one accumulator is provided as a plurality of accumulators; and
each of the plurality of accumulators is connected to at least one of the one or more 3-way solenoid valves.

7. The brake apparatus of claim 6, wherein the one or more 3-way solenoid valves are connected to each of the plurality of accumulators.

8. A brake apparatus for a vehicle, comprising:
a 3-way solenoid valve unit including one or more 3-way solenoid valves;
a valve block having a first surface on which the 3-way solenoid valve unit is installed;
at least one accumulator configured to store a working fluid;
a pressurizing unit configured to pressurize the working fluid; and
a plurality of wheel cylinders configured to restrict rotation of vehicle wheels using a hydraulic pressure of the working fluid, wherein each 3-way solenoid valve includes a first port, a second port, a third port, a first opening/closing flow path configured to allow the first port and the second port to fluidly communicate with each other or to block the first port and the second port from each other, and a second opening/closing flow path configured to allow the second port and the third port to fluidly communicate with each other or to block the second port and the third port from each other, at least a part of the at least one accumulator is disposed between the 3-way solenoid valve unit and a second surface of the valve block, the pressurizing unit includes a motor pump disposed in the valve block, and a high pressure switch valve is installed on a flow path connecting an inlet of the motor pump and the at least one accumulator.

9. The brake apparatus of claim 8, wherein:

a motor of the motor pump is installed on a third surface of the valve block, which is a surface opposite to the first surface.

10. A brake apparatus for a vehicle, comprising:

a 3-way solenoid valve unit including one or more 3-way solenoid valves;

a valve block having a first surface on which the 3-way solenoid valve unit is installed;

at least one accumulator configured to store a working fluid;

a pressurizing unit configured to pressurize the working fluid;

a plurality of wheel cylinders configured to restrict rotation of vehicle wheels using a hydraulic pressure of the working fluid; and at least one pressure sensor configured to detect a hydraulic pressure of at least one of the plurality of wheel cylinders and a hydraulic pressure of a master cylinder, wherein each 3-way solenoid valve includes a first port, a second port, a third port, a first opening/closing flow path configured to allow the first port and the second port to fluidly communicate with each other or to block the first port and the second port from each other, and a second opening/closing flow path configured to allow the second port and the third port to fluidly communicate with each other or to block the second port and the third port from each other, at least a part of the at least one accumulator is disposed between the 3-way solenoid valve unit and a second surface of the valve block, and the pressurizing unit includes the master cylinder configured to generate a hydraulic pressure corresponding to a brake signal.

11. The brake apparatus of claim 10, wherein:

the at least one pressure sensor is disposed between the 3-way solenoid valve unit and a fourth surface of the valve block; and the fourth surface is a surface perpendicular to the first surface and the second surface.

* * * * *